United States Patent
Dantrey et al.

(10) Patent No.: US 10,871,939 B2
(45) Date of Patent: Dec. 22, 2020

(54) METHOD AND SYSTEM FOR IMMERSIVE VIRTUAL REALITY (VR) STREAMING WITH REDUCED AUDIO LATENCY

(71) Applicant: Nvidia Corporation, Santa Clara, CA (US)

(72) Inventors: Ambrish Dantrey, Pune (IN); Abhijit Patait, Pune (IN); Utkarsh Patankar, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 106 days.

(21) Appl. No.: 16/183,378

(22) Filed: Nov. 7, 2018

(65) Prior Publication Data

US 2020/0142664 A1 May 7, 2020

(51) Int. Cl.
| | | |
|---|---|---|
| G06F 15/16 | (2006.01) |
| G06F 3/16 | (2006.01) |
| H04L 29/06 | (2006.01) |
| H04L 29/08 | (2006.01) |

(52) U.S. Cl.
CPC ............ *G06F 3/165* (2013.01); *H04L 67/18* (2013.01); *H04L 67/38* (2013.01)

(58) Field of Classification Search
CPC .......... G06F 3/165; H04L 67/18; H04L 67/38
USPC ....................................................... 709/217
See application file for complete search history.

(56) References Cited

U.S. PATENT DOCUMENTS

| | | | |
|---|---|---|---|
| 8,520,872 B2* | 8/2013 | Jang ...................... H04S 7/302 |
| | | | 381/310 |
| 9,609,436 B2* | 3/2017 | Gamper ............... H04R 1/1075 |
| 9,992,602 B1* | 6/2018 | Allen ..................... H04S 3/004 |
| 10,028,070 B1* | 7/2018 | Gamper ............. G06K 9/00268 |
| 10,088,900 B2* | 10/2018 | Kondo ................... G06F 3/165 |
| 10,089,063 B2* | 10/2018 | Thagadur Shivappa .................. G06F 3/011 |
| 10,089,071 B2* | 10/2018 | Kohler .................. A63F 13/211 |
| 10,212,533 B2* | 2/2019 | Menard .................. H04S 3/008 |
| 10,278,001 B2* | 4/2019 | Edry ....................... A63F 13/86 |
| 10,278,002 B2* | 4/2019 | Gamper ................. H04S 7/304 |
| 10,303,244 B2* | 5/2019 | Hashimoto ............ A63F 13/49 |
| 10,390,166 B2* | 8/2019 | Chen ...................... G06F 3/165 |
| 10,412,527 B1* | 9/2019 | Miller .................. H04N 13/204 |
| 10,425,761 B2* | 9/2019 | Lehtiniemi ............ H04S 7/303 |
| 10,491,711 B2* | 11/2019 | Hancock ................ H04L 65/80 |
| 10,514,885 B2* | 12/2019 | Leppanen ........... G06F 3/04815 |

(Continued)

Primary Examiner — Alicia Baturay
(74) Attorney, Agent, or Firm — Shook, Hardy & Bacon, LLP (57) ABSTRACT

A virtual reality (VR) audio rendering system and method of using HRTF functions to quickly capture new positional cues to pre-computed audio frames responsive to changes in user position relative to sound systems. In a client-server VR system, when a user position change is detected, the client determines an appropriate HRTF based on the new position and convolves them with a set of audio frames that have been generated by the server based on a prior position, resulting in modified frames for rendering. Meanwhile, the client propagates the new position to the server to generate subsequent audio frames for the corrected position. As HRTF convolution is computationally inexpensive, the latency between user position change and the resultant sound change as perceived by the user can be significantly reduced. As a result, an immersive VR experience of the user can be preserved.

20 Claims, 6 Drawing Sheets

(56) References Cited

U.S. PATENT DOCUMENTS

| | | | |
|---|---|---|---|
| 10,595,147 B2* | 3/2020 | Latypov | H04S 7/304 |
| 10,602,296 B2* | 3/2020 | Laaksonen | H04S 7/303 |
| 10,705,790 B2* | 7/2020 | Dantrey | H04L 67/18 |
| 10,713,001 B2* | 7/2020 | Tamaoki | H04R 5/04 |
| 2012/0207308 A1* | 8/2012 | Sung | H04S 7/304 |
| | | | 381/17 |
| 2014/0270188 A1* | 9/2014 | Hall | H04S 7/303 |
| | | | 381/17 |
| 2015/0030159 A1* | 1/2015 | Ozcan | G01C 21/3629 |
| | | | 381/17 |
| 2015/0036848 A1* | 2/2015 | Donaldson | H04S 7/303 |
| | | | 381/303 |
| 2016/0088417 A1* | 3/2016 | Kim | H04S 1/005 |
| | | | 381/17 |
| 2017/0153866 A1* | 6/2017 | Grinberg | G02B 27/017 |
| 2017/0282062 A1* | 10/2017 | Black | A63F 13/323 |
| 2017/0295446 A1* | 10/2017 | Thagadur Shivappa | |
| | | | G06F 3/011 |
| 2017/0359671 A1* | 12/2017 | Eronen | H04H 60/04 |
| 2018/0217806 A1* | 8/2018 | Jang | G06T 7/73 |
| 2018/0275861 A1* | 9/2018 | Mate | G06F 3/165 |
| 2018/0288558 A1* | 10/2018 | Umminger | G11B 27/038 |
| 2018/0367935 A1* | 12/2018 | Liao | H04S 1/002 |
| 2019/0139312 A1* | 5/2019 | Leppanen | G06F 3/0486 |
| 2019/0324708 A1* | 10/2019 | Miyazaki | G06F 3/005 |
| 2019/0335292 A1* | 10/2019 | Leppanen | G06F 3/165 |
| 2019/0369731 A1* | 12/2019 | Verbeke | H04R 1/025 |
| 2020/0100044 A1* | 3/2020 | Yan | G06F 3/167 |

* cited by examiner

METHOD AND SYSTEM FOR IMMERSIVE VIRTUAL REALITY (VR) STREAMING WITH REDUCED AUDIO LATENCY

FIELD OF THE INVENTION

Embodiments of the present invention are related to audio data processing, and more specifically, to mechanisms for reducing perceived audio latency in virtual reality applications.

BACKGROUND OF THE INVENTION

While virtual reality (VR) opens up exciting opportunities in several areas including content creation, and sports, entertainment and game broadcasting, VR applications also bring new challenges when attempting to deliver immersive experiences to a broad base of users. One of the most difficult challenges faced by the current VR industry is latency. For instance, video latency of more than 50 milliseconds (ms) between a head movement and the resultant change in displayed images can lead to a detached sensory experience, and can also contribute to motion sickness and dizziness in a user. A VR system should ideally have a visual delay of less than 15 ms to avoid video latency issues to provide an immersive virtual reality experience.

Similar to video latency, audio latency can be disruptive and immersion-breaking. In a typical client-server gaming system, a remote host server performs the game execution and generates audio frames by taking into account the relative positions between a user's head (e.g., as detected by a head-mounted device (HMD)) and the audio rendering devices, e.g., a set of speakers and/or a headset. The host renders on behalf of one or more clients that simply send input and display output frames. Once a user's head motion is detected, the remote host recalculates audio frames to be rendered based on the new head position and the VR scene content, and streams them for rendering in real time. However, audio frame recalculation requires intensive and real-time computation. Applying and rendering audio frames in this manner could significantly contribute to end-to-end audio latency which leads to glitch experiences to users. Depending on the computing speeds of the host system and the underlying audio layer, the latency from buffer submission to audible output may be as short as 2 ms in high performance PCs using high-end, low-latency audio interfaces, or in the worst cases, as long as hundreds of ms. Such high latency becomes an issue as the relative speed between an audio source and the listener's head increases.

Human listeners can detect the difference between two sound sources that are placed as little as three degrees (3°) apart, about the width of a person at distance of 10 meters. The ear on the far side of the head hears the sound slightly later than the near ear due to its greater distance from the source. Based on a typical head size (about 22 cm) and the speed of sound (about 340 m/s), an angular discrimination of 3° requires a timing precision of about 30 ms.

Low audio latency and positional audio cues are very important for maintaining a realistic and immersive VR experience. If the audio latency between head motion and the resulting audio rendering is large, it undesirably breaks the immersive VR experience. Unfortunately it is difficult for all audio systems to provide low audio latency, and the positional audio cues may also be inaccurate with reference to the user's head position.

SUMMARY OF THE INVENTION

This invention provides a mechanism and method of reducing audio latency related to changes in user head position relative to sound sources in virtual reality (VR) streaming, thereby enhancing the immersive VR experience for users.

In VR content (e.g., game) streaming, audio data may be generated by a server and streamed to a user-controlled local client device for playback, e.g., through a speaker system. To provide an immersive VR experience, the rendered sound carries the appropriate positional cues to the user. Thus, the audio data is generated specific to a user's head position relative to the speaker system. When the user's head moves, the audio data is modified to provide correspondingly adapted positional cues to the user to maintain the immersive VR experience.

Embodiments of the present disclosure include, generating audio data responsive to detection of a new head position of a user player based on the new position by modifying existing audio data that has been generated based on a prior player head position. More specifically, upon receiving a new player head position, a head-related transfer function (HRTF) is generated accordingly and applied on a set of audio frames of that is next in line for rendering, where the set of audio frames have been generated based on a prior or the last-known position of the player. HRTFs provide information on how the ears perceive different frequencies of incoming sounds from different directions. Thus, the modified audio frames are operable to provide the accurate positional cues to the player based on the new head position. At the same time, the new position is also used for generating subsequent audio frames. Compared with using the regular computational processes to generate audio frames afresh (which take into account the virtual contents as well as the new position), HRTF generation and convolution with existing audio frames are computationally inexpensive. Therefore, the modified frames can be advantageously generated and rendered with very low latency, and the audio generated in this fashion sounds natural.

During audio streaming in an exemplary client-server VR system, a client device is responsible for generating an HRTF responsive to a new head position and applying it on a set of audio frames that have been generated based on a prior position by a server. The resultant modified audio frames can then be rendered at an audio rendering device with low latency without being affected by the computation latency of the server or network latency in data transmission from the server. Therefore, an immersive VR experience can be maintained in case of user motions. Meanwhile, the new head position is also provided to the server and used to generate subsequent audio frames. Since low audio latency can be achieved by engaging the client device for audio frame generation, the server can in turn be implemented with even more computational intensive audio processing algorithms that provide further improved immersive VR audio experience.

In some other embodiments, the server is configured to generate an HRTF responsive to receiving information regarding a new head position, and perform convolution on a set of existing audio frames to generate modified frames which are then sent to the client for rendering. In parallel, the server computes subsequent audio frames. As applying an HRTF to modify audio frames is much faster than computing the audio data afresh based on the VR contents, any audio delay caused by position changes can still be advantageously and significantly reduced in this manner.

Therefore, embodiments of the present invention can lead to a substantial reduction in audio latency in a VR streaming system. With reduced latency for VR streaming, video game broadcasters and content providers will be able to stream audio in real-time offering enhanced user experiences.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "performing" or "executing" or "transforming" or "determining" or the like, refer to the action and processes of an integrated circuit, or similar electronic computing device, that manipulates and transforms data represented as physical (electronic) quantities within the computer system's registers and memories into other data similarly represented as physical quantities within the computer system memories or registers or other such information storage, transmission or display devices.

Method and System for Immersive Virtual Reality (VR) Streaming with Reduced Audio Latency Head movements relative to a sound source within a VR setting can change how audio is received and perceived by the user. A head-related transfer function (HRTF) is typically a function of both frequency and relative orientation between the head and a source of the sound field. It is assumed that the sound sources are at known locations. With respect to a given sound field as produced by a sound system, HRTFs can characterize the acoustic levels and phases which occur at ear locations on the head. Therefore, HRTFs provide information on how the ears perceive different frequencies of incoming sounds from different locations.

One aspect of the invention described herein is to apply an HRTF generated based on a new head position to modify existing audio data that was generated (and ready for rendering) based on a prior head position. In effect, the modified audio data can be quickly generated for rendering in response to the position change, and the signals produced by the sound source can provide correct positional audio cues to the user. Advantageously, the modified audio data does not lead to abruptly different audio effects from the set of exiting audio data, while accurate positional audio can be provided in a glitch-free manner. Therefore, the processes and systems in accordance with the embodiments of the present disclosure provide low latency, glitch-free, accurate positional audio for VR headsets.

Embodiments of the present invention provide a method for generating audio in response to positional changes between a user and an audio rendering system in a virtual reality setting. In one or more embodiments, the user's head position is referenced. Methods in accordance with embodiments of the present invention enable fast generation of audio data for rendering responsive to user movements to provide an immersive VR experience while reducing the computational overhead required to provide realistic, natural sound effects.

When a user's head movement is detected by a head-mounted device or a new user head position is otherwise provided, an HRTF is generated or selected based on the new position. The HRTF is then convolved with one or more existing frames that are next in line for rendering. The existing frames correspond to a prior user position. For example, the existing frames are generated based on the prior user position. In this manner, the generation and rendering of audio frames that factor in the new position cues can be accomplished with low latency because HRTF convolution is less computationally intensive than normal audio frame generation processes that incorporate the VR content, and also because the frames to be convolved with the HRTF are readily available at the time of convolution.

Figure 1:
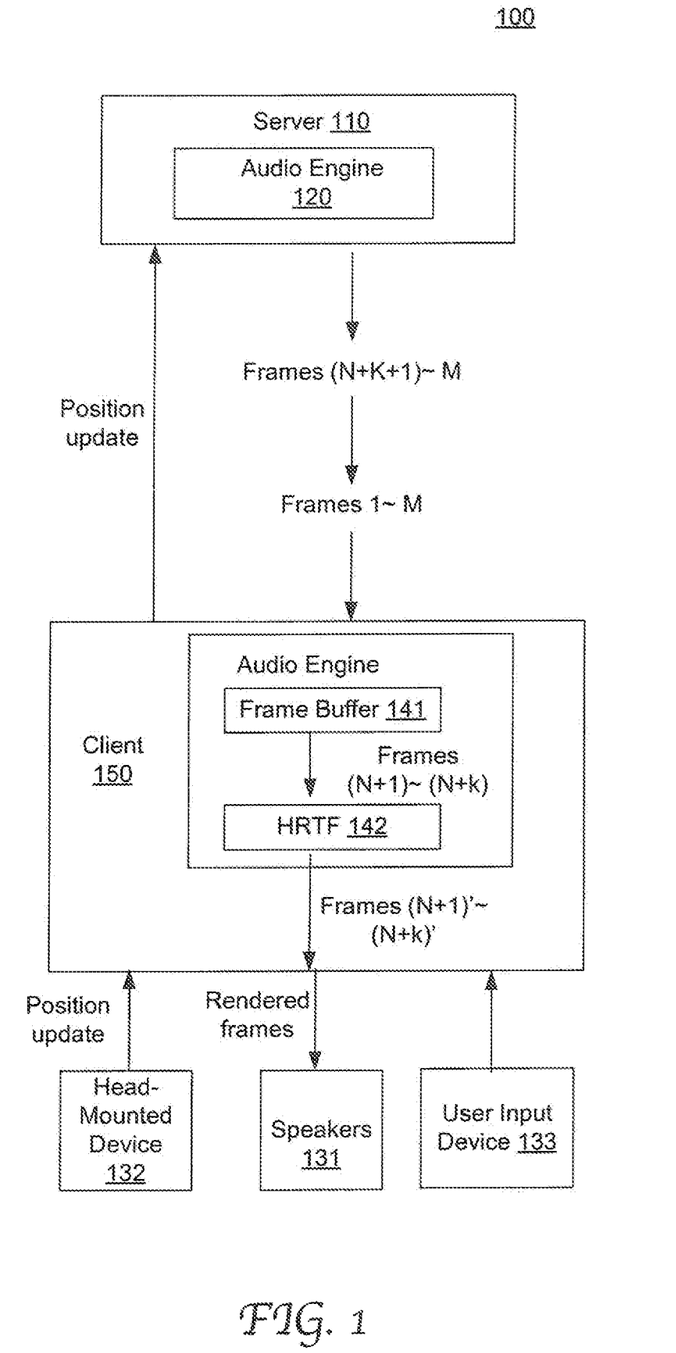
FIG. 1 is a block diagram illustrating an exemplary VR streaming computer system in which a client device is configured to modify audio frames in response to user position updates in accordance with an embodiment of the present disclosure.

The present disclosure can be applied in a content streaming system, a client-server content streaming system, an individual game console, a Peer-to-Peer (P2P) networked game system, or any other suitable system that provides an audio experience by using spatialized audio data. FIG. 1 is a block diagram illustrating an exemplary VR streaming system 100 in which a client device is configured to modify audio frames in response to user position updates based on head movement in accordance with an embodiment of the present disclosure.

In a simplified form, the VR streaming system 100 includes a server 110 and a client device 150 coupled through one or more networks. For instance, a VR game program is executed at the server 110, and video and audio frames are generated in the server 110 and streamed to the (for example and without limitation) remote client device 150 for rendering. In example non-limiting embodiments, the client device 150 can be coupled to an audio playback device such as a speaker system (not shown). As shown in FIG. 1, the client device 150 can also be coupled to a head-mounted device 132 wearable on a user's head and capable of sensing the user's head position and orientation, and a user input device 133 (e.g., a console controller) for receiving user input. In other non-limiting embodiments, the user may alternatively access headphone surround sound through the client device itself or a home theater receiver and an audio/video (AV) preamp processor that are communicatively coupled to the client 150 that provides surround sound processing. It will be appreciated that the present disclosure is not limited to any specific type of audio rendering device or sound receiving devices.

Herein "user position" or "user motion" refers to a user head position, orientation or motion relative to one or more sound sources, e.g., a multi-channel speaker system or a virtual sound source in a virtual setting. The positions of the sound sources are known. A change of user position would cause a change in the user's perception to the sound. The VR system 100 is equipped to dynamically adapt spatialized audio based on the head position of the user relative to the speaker system 131 or a virtual sound source. It will be appreciated that the present disclosure is not limited to any specific type of device or sensors that can detect and supply positional information and any of a number of well known devices can be used. For example, the positional information may originate from one or more sensors of an HMD, a game controller, a keyboard, wearable sensors, etc.

During operation, the client 150 can receive positional update information (including location and orientation information for example) from the HMD 132 and the game controller 133 and propagate the information to the server. The server 110 is configured to execute the game application and generate changed audio and video frames based on position information sent from the client 150.

More specifically, the server 110 includes an audio engine 120 configured to generate audio frames based on VR scene content and a last-known user position provided by the client 150. The server audio engine 120 may use a frame number or timestamp to indicate the time when the processed audio needs to be played out and also to correlate the corresponding user position. For instance, frames numbered 1~M are generated by the server audio engine 120 and streamed to the remote client 150.

According to embodiments of the present disclosure, the client 150 also has an audio engine 140 capable of adapting a number of audio frames to a user position change. As soon as a change in user position is detected, a set of pre-computed audio frames are convolved with an HRTF at the client to generate modified frames for rendering without noticeable lag. Hence the VR system temporarily offloads some of the audio frame generation tasks to the client 150 upon detection of a user position change. The client audio engine 140 includes a frame buffer 141 and an HRTF module 142. Streamed frames are buffered at the frame buffer 141 before rendering.

For instance, new user head positional information is received by the client 150 when a frame N (N<M) is being rendered through the speakers 131, at which time frames (N+1)~(N+k) have been received and stored in the frame buffer 141. In response, the HRTF module 142 generates an HRTF based on the new head position. Alternatively, an HRTF may be selected from a set of pre-determined HRTFs that correspond to different predicted positions. The HRTF selection may be performed by comparing the predicted positions with the detected new position. However, it will be appreciated that an HRTF can also be generated, selected, or otherwise determined in any suitable manner that is well known in the art without departing from the scope of the present disclosure. The audio frames may represent monophonic sound or one channel of surround sound. In some embodiments, multiple HRTFs may be determined based on a user position, corresponding to multiple audio channels, and each HRTF is used to modify a set of audio frames of the corresponding channel.

The resultant HRTF (either selected or generated) is then convolved at the client with one or more frames stored in the buffer 141 that correspond to the prior position. For example, a total number of k frames are modified, e.g., the frames (N+1)~(N+k), to generate modified frames (N+1)'~(N+k)' which are supplied for rendering through the speakers 131. In some examples, all of the k frames are stored in the buffer 141 at the time of new position detection. However, in some other instances, some of the k frames may be streamed to the client 150 after the new head position detection, in which case HRTF convolution is performed on the frames on the fly.

Meanwhile, the new position is propagated to the server 110 and used to generate the subsequent frames, including regenerating frames (N+k+1)~M for example. These frames are streamed to the client 150 for rendering, resulting in sound that provides accurate positional cues to the user.

The number of frames to be modified by the HRTF may be preset based on the estimated latency for the new position to be sent to the server and processed to generate new frames for rendering. In some other embodiments, the number k may be a variable depending on the current latency experienced by the system. For example, HRTF-modified frames are rendered at the client device until such time that frames generated from the server based on the new position are received and used.

Figure 2:
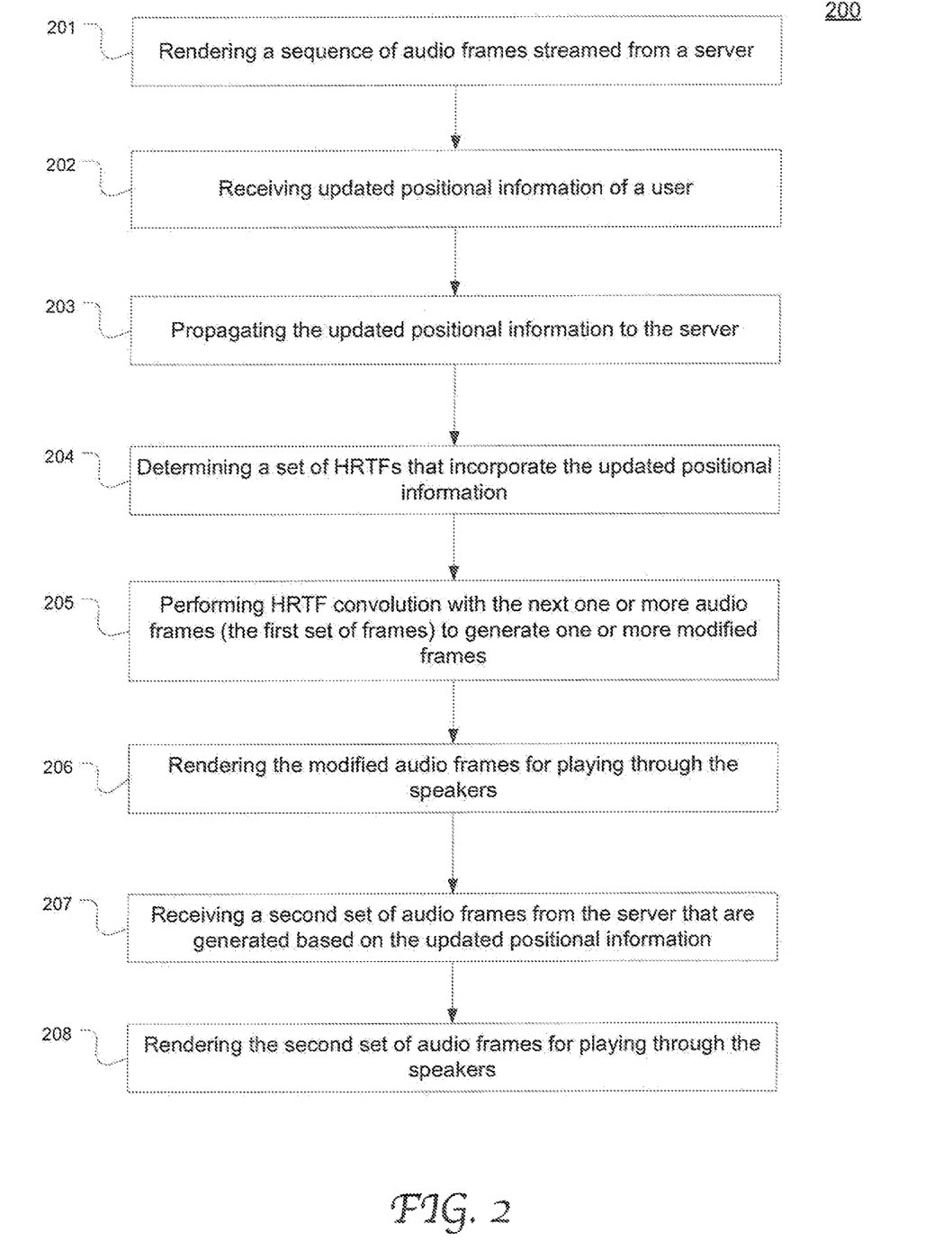
FIG. 2 is a flow chart depicting an exemplary computer implemented process of using a client device to generate audio frames by performing HRTF convolution on audio frames in accordance with an embodiment of the present disclosure.

FIG. 2 is a flow chart depicting an exemplary process 200 of using a client device to generate audio frames by performing HRTF convolution in accordance with an embodiment of the present disclosure. For example, process 200 may be performed by the client device 150 as in the VR system 100 shown in FIG. 1. At 201, a sequence of audio frames is received for playing through an output device (e.g., a speaker or a headset). The audio frames may be generated by, and supplied through, a network from a remote server based on the last-known positional information (the first positional information), for example. At 202, updated positional information is received from an HMD device. At 203, the updated information is propagated from the client device to the server and used by the server to generate new audio frames. At 204, the client determines an HRTF that captures the updated positional information and performs HRTF convolution with the next one or more frames (the first set of frames) that have been generated by the server based on the first positional information, thereby producing modified audio frames at 205. At 206, the modified audio frames are rendered for playback through the speakers. At 207, subsequent audio frames (a second set of audio frames) that are generated based on updated positional information are delivered to the client for rendering.

Thus, according to preferred embodiments, before the second set of audio frames that are generated based on the updated positional information can be made available for rendering, the modified audio frames resulting from HRTF convolution can be generated locally at the client and advantageously quickly rendered responsive to the position update to reduce perceived audio latency. From a user's perception, there would be little or no latency between the position change and the corresponding positional cue change in the played sound.

Figure 3:
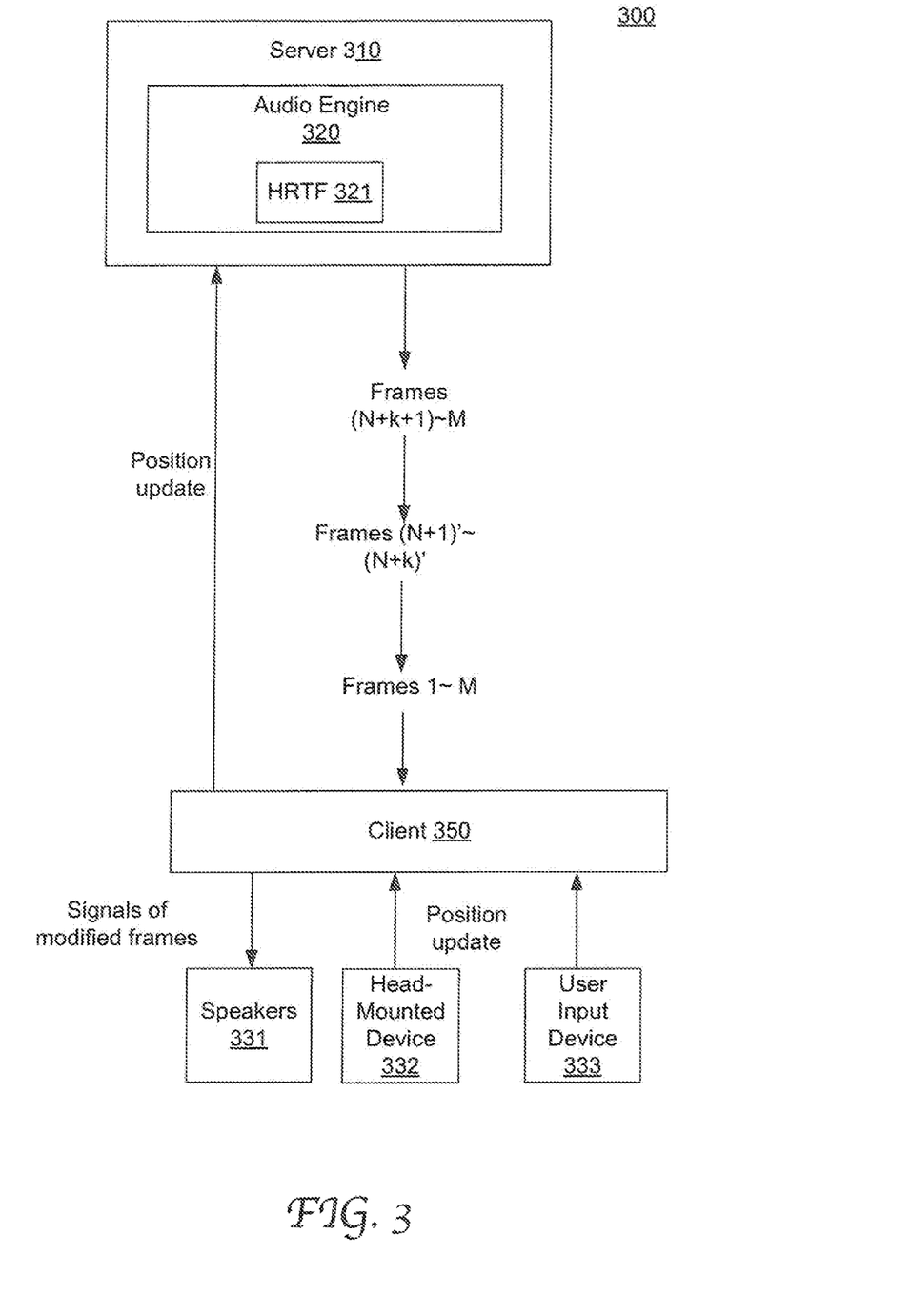
FIG. 3 is a block diagram illustrating an exemplary VR streaming computer system in which a sever device is configured to modify audio frames in response to user position updates based on user head position in accordance with an embodiment of the present disclosure.

In some other embodiments, upon a new position being detected, the server reacts to modify previously generated audio frames by HRTF convolution. FIG. 3 is a block diagram illustrating an exemplary VR streaming system 300 in which a server device 310 is configured to modify audio frames in response to user position updates in accordance with an embodiment of the present disclosure. System 300 includes a server device 310 and a remote client device 350 communicatively coupled through one or more networks. The server audio engine 320 includes an HRTF module 321. Video and audio frames are generated at the server 310 and streamed to the client 350 for rendering. The client device 350 is coupled to a speaker system 331, a head-mounted device 332 and a user input device (e.g., a game controller) 333.

For instance, in this embodiment, the server generates frames 1~M based on a last-known position and sends the frames to the client for rendering. At the time of rendering frame N, a new position is detected and the updated positional information is received by the server 310. In response, the server determines an HRTF based on the new position and performs HRTF convolution with the frames (N+1)~(N+k). The convolution results in the modified frames (N+1)'~(N+k)' which are supplied to the client for rendering. The server also performs the regular frame computation process and regenerates the subsequent frames (N+k+1)~M, as well as the following frames, using the new position. As using HRTF convolution to modify audio frames is much faster than computing the multichannel audio frames afresh based on the VR content in the application, audio delays caused by head position changes can still be advantageously and significantly reduced in this manner by this embodiment.

Figure 4:
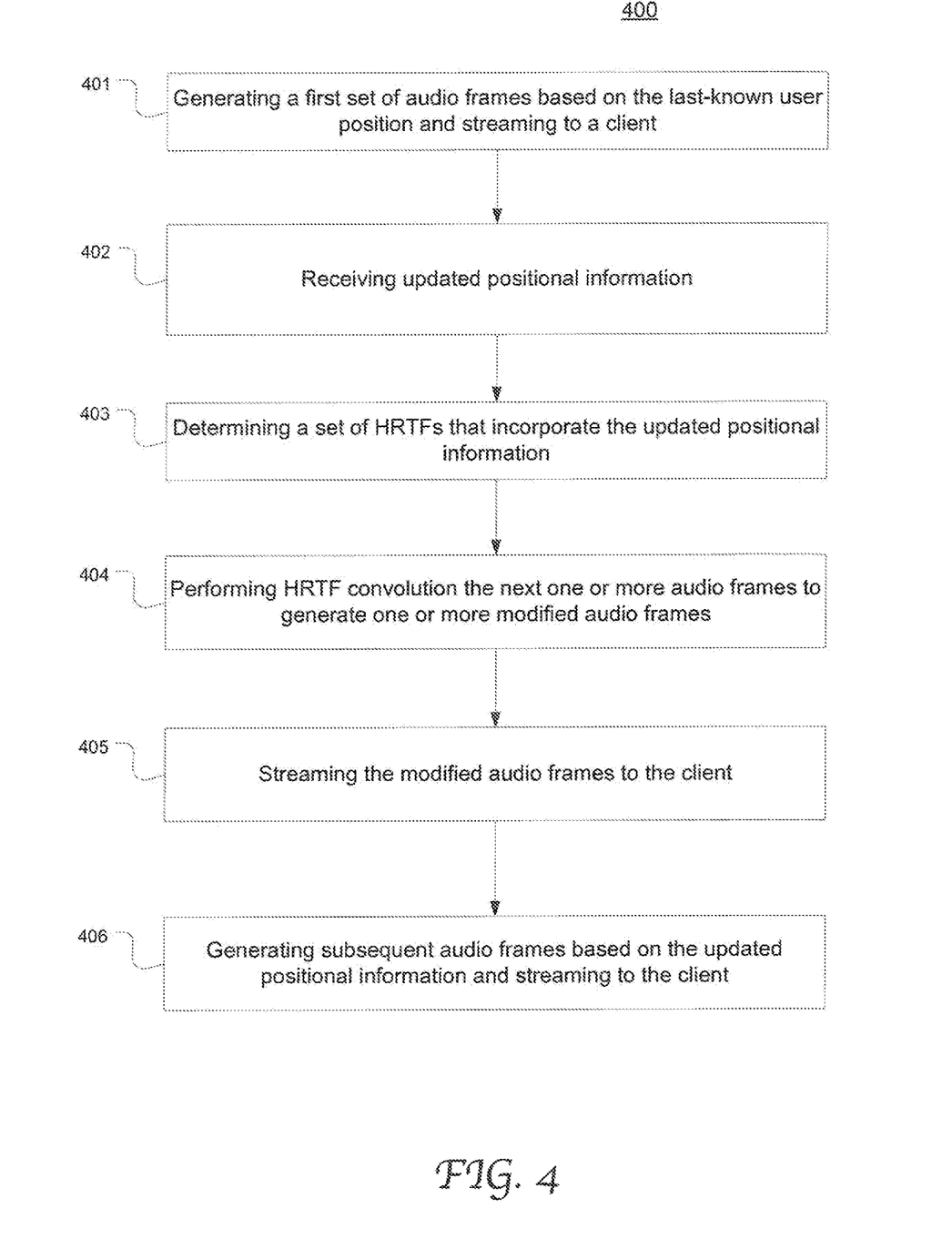
FIG. 4 is a flow chart depicting an exemplary computer implemented process of a server device generating HRTF-modified frames for rendering at a client device in response to new position detection in accordance with an embodiment of the present disclosure.

FIG. 4 is a flow chart depicting an exemplary computer implemented process 400 of a server device generating HRTF-modified frames for rendering at a client device in response to a new position being detected in accordance with an embodiment of the present disclosure. At 401, the server generates a first set of audio frames based on last-known user positional information and the virtual scene content. At 402, the updated position information is propagated from a client device to the server. At 403, the server determines an HRTF that incorporates the updated positional information. At 404, the server performs HRTF convolution on one or more frames that have been generated and are next in line for rendering, thereby producing one or more modified audio frames. At 405, the modified frames are streamed to the client for rendering. At 406, the sever generates frames that succeed the modified audio frames and sends the frames to the client for rendering.

Figure 5:
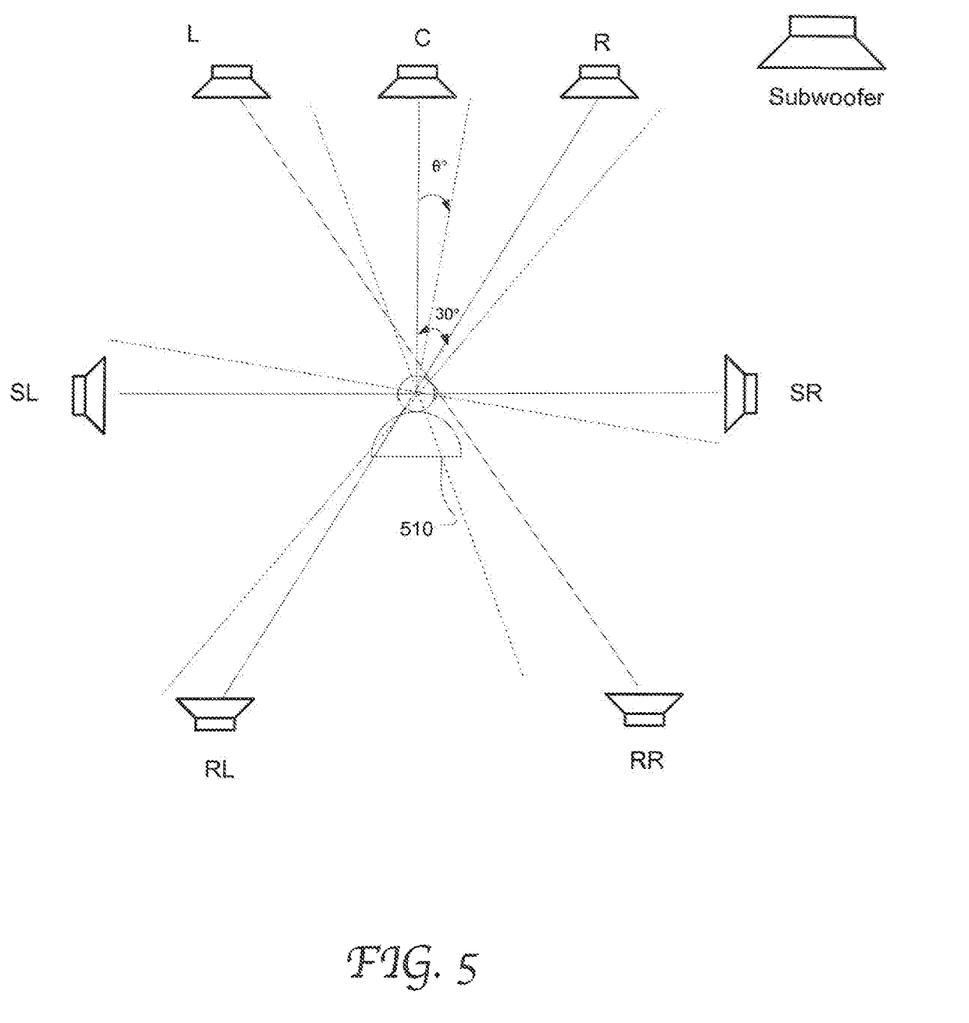
FIG. 5 is a diagram illustrating an exemplary arrangement of a multichannel speaker system with reference to a player which is used to generate HRTF functions.

FIG. 5 is a diagram illustrating an exemplary arrangement of a multichannel speaker system with reference to a player 510 which is used to generate HRTF functions. In this example, the user is wearing a headset that supports a 7.1 channel audio (with a subwoofer) with the known speaker positions as illustrated. It is assumed that the user 510 is using a VR headset that supports 7.1 channel audio with the speaker positions as shown in FIG. 5. In this 7.1 speaker system, relative to the user, the angular positions of the center (C) 501, left (L) 502, right (R), side left (SL), side right (SR), rear left (RL) and rear right (RR) speakers are 0°, −30°, 30°, −90°, 90°, −150° and 150°, respectively. All angles are measured with the line going straight in front of the user as the reference at 0°, and the angles measured in clockwise direction from the reference treated as positive.

For instance, the user was looking straight ahead of him/her for the first N frames, and then the user turns his/her head θ° to the right. For example, it would take t milliseconds (ms) for the new head position to be sent to the server and processed, which corresponds to a latency of k audio frames. So, starting from the head movement, for a particular channel, the audio frames from N+1 to N+k produced by the server would have audio cues corresponding to the previous head position, which can lead to poor VR audio experience of the user. According to embodiments of the present disclosure, the frames (N+1)~(N+k) of a specific channel are modified by an HRTF configured for the same channel to immediately capture the position change in the rendered audio.

More specifically, the user head movement can be treated as movement of all the speakers by θ° to the left while keeping the head position as it is, which results in the speaker positions of the center (C), left (L), right (R), side left (SL), side right (SR), rear left (RL) and rear right (RR) speakers to be −θ°, −(30−θ)°, (30−θ)°, −(90−θ)°, (90−θ)°, −(150−θ)° and (150−θ°), respectively. As the new positions of the speakers (relative to the user) are known, the corresponding HRTFs for the multiple channels can be determined accordingly.

To reduce the latency between the change in head position and the corresponding audio change, a determined HRTF is applied to the audio frames (N+1) to (N+k) to generate modified audio frames (N+1)' to (N+k)' that can create the effect to the user that the rendered sound comes from the new speaker positions. Moreover, in case the audio processing takes more time due to the head movement and if the audio frames (N+1)~(N+k) are not received by the client when they should be played out, the determined HRTF can be applied to the audio frames prior to frame N and generate the audio frames N+1 to N+k.

Since an HRTF takes propagation delay of sounds through the propagation medium into account, the audio generated this way sounds natural. Applying an HRTF to the audio frames adds positional cues, and therefore the modified audio frames (N+1)'~(N+k)' generated in this way seem to be coming from the new speaker positions which keeps the VR experience intact and glitch-free.

Figure 6:
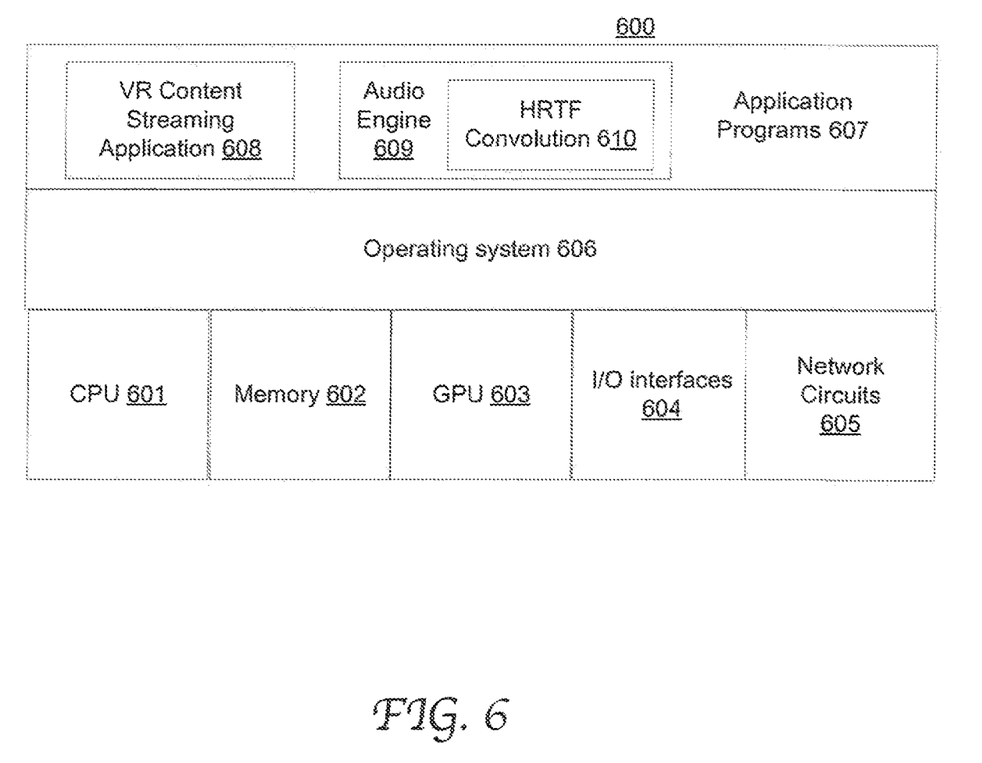
FIG. 6 is a block diagram illustrating an exemplary computing device configured to perform HRTF convolution to modify audio frames based on a new user position in accordance with an embodiment of the present disclosure.

FIG. 6 is a block diagram illustrating an exemplary computing device 600 configured to perform HRTF convolution to modify audio frames based on a new user position in accordance with an embodiment of the present disclosure. Device 600 may be a general-purpose computing device configured as a client in a VR game streaming system (e.g., system 100 in FIG. 1). The device 600 may be a desktop, a laptop, smart phone, touchpad, a game console, a HMD, etc. The device 600 may also be configured as a server in another VR content streaming system (e.g., system 300 in FIG. 3).

The device 600 comprises a processor 601, a system memory 602, a GPU 603, I/O interfaces 604 and network circuits 605, an operating system 606 and application software 607 stored in the memory 602, including a VR content streaming application 608, the audio engine 609 with the HRTF module 610. The device 600 may be coupled to one or more peripheral devices through the I/O interfaces 604, such as a set of speakers, a HMD, a user input device or controller, a keyboard, etc. Through the network circuits 605, the computing system 600 is coupled to other computing devices through a communication network, such as a server or a client.

When provided with updated positional information (e.g., from the HMD), and executed by the CPU 601, the HRTF module 640 can determine an HRTF that incorporates the new user position relative to the speakers, and perform convolution to modify one or more audio frames that are generated based on a prior position in accordance with an embodiment of the present disclosure. The VR content application 608 and the audio engine 609 may perform various other functions that are well known in the art as discussed in detail with reference to FIGS. 1-4.

As will be appreciated by those with ordinary skill in the art, the HRTF module 610 in FIG. 6 can be implemented in any one or more suitable programming languages that are well known to those skilled in the art, such as C, C++, Java, Python, Perl, C #, SQL, etc. In some embodiments, the HRTF module may be, at least partially, implemented by using circuitry, e.g., an Application-Specific Integrated Circuit (ASIC).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer implemented method comprising:
   receiving, by a client device and from a server device, a sequence of audio frame data generated to correspond to first positional information of a user of the client device;
   receiving, by the client device and during rendering of a set of audio frames from the sequence of audio frame data using an audio rendering device associated with the client device, second positional information related to the user;
   modifying, by the client device, at least a subset of the set of audio frames based at least in part on the second positional information to generate a set of modified audio frames; and
   rendering the set of modified audio frames using the audio rendering device.

2. The computer implemented method of claim 1, wherein the second positional information is generated by one or more sensors corresponding to a head-mounted display communicably coupled to the client device.

3. The computer implemented method of claim 1, wherein the modifying comprises performing convolution on the subset of the set of audio frames by applying a Head Related Transfer Function (HRTF).

4. The computer implemented method of claim 3, wherein the HRTF is configured with a propagation delay of sound through a propagation medium specific to the audio rendering device and is configured based at least in part on the second positional information with reference to the first positional information of the user.

5. The computer implemented method of claim 1, further comprising:
   sending the second positional information from the client device to the server device;
   receiving, by the client device, another sequence of audio frame data generated by the server device and based at least in part on the second positional information; and
   rendering, using the audio rendering device and after the rendering the set of modified audio frames, another set of audio frames based at least in part on the another sequence of audio frame data.

6. The computer implemented method of claim 1, wherein the set of audio frames has a predefined number of audio frames.

7. The computer implemented method of claim 1, wherein the set of audio frames is buffered at the client device.

8. The computer implemented method of claim 1, wherein the modifying is performed responsive to an indication that a delay for the client device to receive audio frames generated based at least in part on the second positional information by the server device is greater than a predefined audio latency threshold.

9. An apparatus comprising:
   one or more processors;
   an audio rendering device;
   one or more network circuits operable to communicatively couple said apparatus to a server device through a network; and
   one or more memory devices coupled to the processor and storing instructions that, when executed by the one or more processors, cause the one or more processors to perform operations comprising:
   receiving, from the server device, a sequence of audio frame data generated to correspond to first positional information of a user;
   receiving, during rendering of a set of audio frames from the sequence of audio frame data using the audio rendering device, second positional information related to the user;

modifying at least a subset of the set of audio frames based at least in part on the second positional information to generate a set of modified audio frames; and rendering the set of modified audio frames using the audio rendering device.

10. The apparatus of claim 9, wherein the second positional information is related to an updated head position of the user and is generated using one or more sensors corresponding to a head-mounted display communicably coupled to the apparatus.

11. The apparatus of claim 10, wherein the modifying comprises performing convolution on the subset of the set of audio frames by using a Head Related Transfer Function (HRTF) associated with the updated head position of the user.

12. The apparatus of claim 11, wherein the HRTF is configured with a propagation delay of sound through a propagation medium specific to the audio rendering device and is configured based at least in part on the second positional information with reference to the first positional information of the user.

13. The apparatus of claim 11, wherein the operations further comprise:
sending the second positional information to the server device;
receiving another sequence of audio frame data generated by the server device based at least in part on the second positional information; and
rendering another set of audio frames based at least in part on the another sequence of audio frame data using the audio rendering device.

14. The apparatus of claim 9, wherein the set of audio frames has a predefined number of audio frames.

15. The apparatus of claim 9, wherein the modifying is performed responsive to an indication that a delay for the apparatus to receive audio frames generated based at least in part on said second positional information by the server device is greater than a predefined audio latency threshold.

16. A computer implemented method comprising:
generating, by a server device, a set of audio frames for rendering using an audio rendering device of a client device, the set of audio frames corresponding to first positional information of a user;
receiving, from the client device, second positional information corresponding to the user;
determining a head-related transfer function (HRTF) based at least in part on the second positional information;
applying the HRTF to modify at least a subset of the set of audio frames to generate a set of modified audio frames corresponding to the second positional information of the user; and
transmitting, from the server device and to the client device, a stream of audio frame data representative of the set of modified audio frames for rendering using the audio rendering device of the client device.

17. The computer implemented method of claim 16, wherein the modifying comprises performing convolution on the subset of the set of audio frames by applying the HRTF.

18. The computer implemented method of claim 17, wherein the HRTF and the set of audio frames are generated by the server device.

19. The computer implemented method of claim 18, further comprising:
generating another set of audio frames for rendering based at least in part on the second positional information; and
transmitting, from the server device and to the client device, another stream of audio frame data representative of the another set audio frames.

20. The computer implemented method of claim 16, wherein the determining the HRTF comprises selecting the HRTF from a set of pre-computed HRTFs, the set of pre-computed HRTFs corresponding to a set of possible update positions corresponding to the first positional information.

* * * * *